United States Patent [19]

Kosi

[11] Patent Number: 4,875,691
[45] Date of Patent: Oct. 24, 1989

[54] RADIAL SEAL

[75] Inventor: Ceasar U. Kosi, Garden Grove, Calif.

[73] Assignee: Westinghouse Electric Corp., Pittsburgh, Pa.

[21] Appl. No.: 152,726

[22] Filed: Feb. 5, 1988

[51] Int. Cl.$^4$ .............................................. F16J 15/00
[52] U.S. Cl. .................................... 277/147; 277/151; 277/157
[58] Field of Search ............... 277/173, 174, 175, 176, 277/177, 147, 151, 157, 53, 148, 154, 153; 432/72

[56] References Cited

U.S. PATENT DOCUMENTS

| | | | |
|---|---|---|---|
| 1,319,700 | 10/1919 | Gould | 432/72 |
| 1,998,492 | 4/1935 | Christensen | 277/53 |
| 2,469,078 | 5/1949 | Robison | 277/148 |
| 3,822,651 | 7/1974 | Harris et al. | 110/234 |
| 4,111,439 | 9/1978 | Schmidt | 277/153 |
| 4,209,175 | 6/1980 | Bliemeister | 277/154 |
| 4,400,154 | 8/1983 | Leintz | 277/153 |
| 4,405,137 | 9/1983 | Webb | 277/153 |

Primary Examiner—William A. Cuchlinski, Jr.
Assistant Examiner—Jeff Hohenshell

[57] ABSTRACT

A radial seal for use in connection with a cylindrical rotatable member passing through a stationary member which includes a circular floating shoe mounted to the stationary member and surrounding the rotatable member in order to accommodate axial, lateral and rotational movement of the rotatable member while still providing an effective seal.

5 Claims, 1 Drawing Sheet

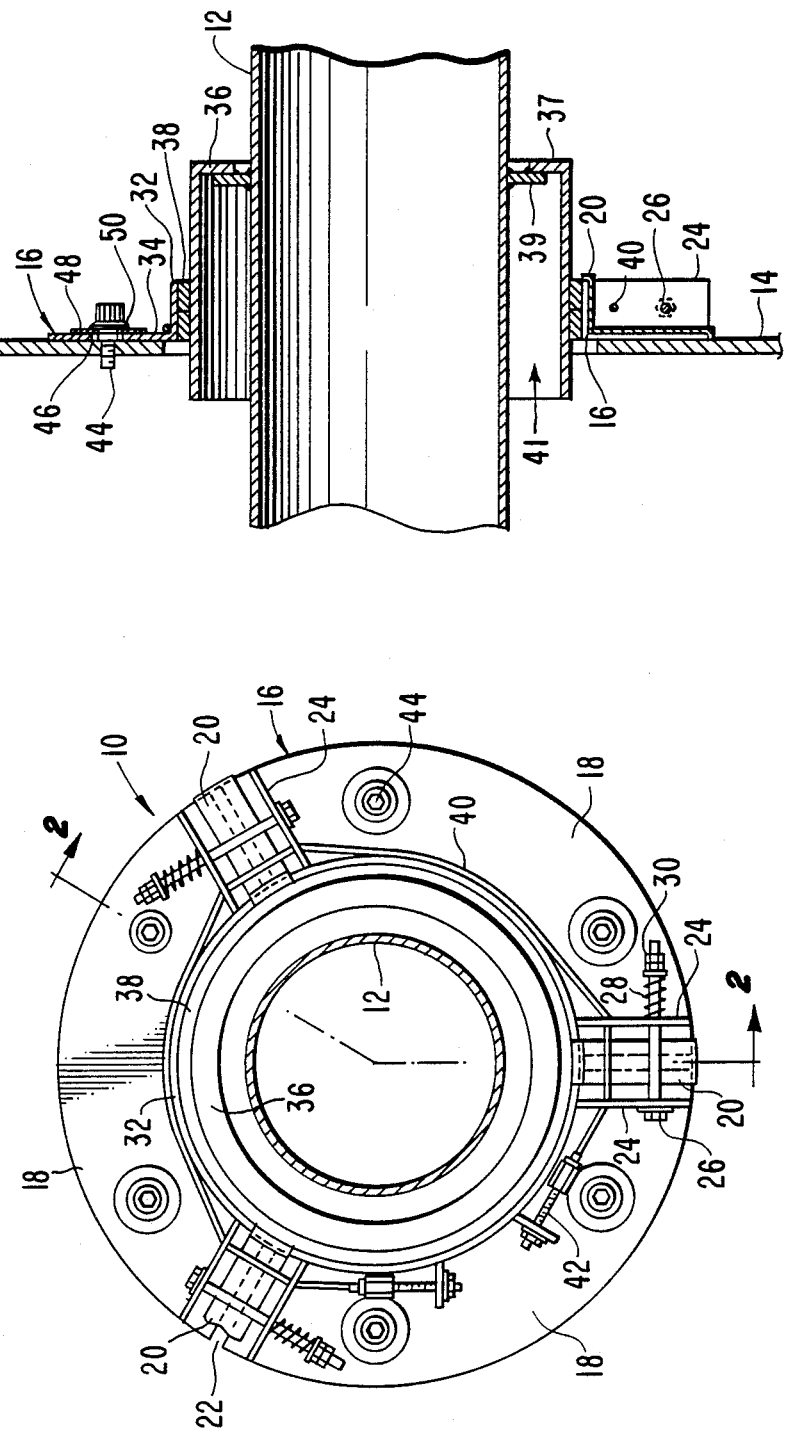

RADIAL SEAL

BACKGROUND OF THE INVENTION

1. Field of the Invention

The invention relates to a radial seal for use in connection with a cylindrical rotatable member passing through a stationary member and, more particularly, to an improved radial seal useful in a rotary combustor system.

2. Description of the Related Art

In certain industrial operations, it is necessary to maintain a substantially air tight seal between a cylindrical rotatable member and a stationary member through which the rotatable member passes. This is particularly true in connection with rotary combustor systems wherein a rotatable member such as a pipe or shaft passes through a stationary wall of a boiler. In such systems, a substantially air tight seal must be maintained between the rotatable member and the stationary member to keep heat losses to a minimum and control the temperature in the combustor system. Frequently, the rotary member is out of round and therefore has an eccentric movement. Moreover, since combustor systems are operated at high temperatures, means must be provided for accommodating expansion and contraction of the parts. In the circumstances, it is difficult to provide a substantially air tight radial seal.

Radial seals for use in connection with rotary kilns heretofore have been known in the art. For example, Robison U.S. Pat. No. 2,469,078 discloses a seal for rotary kilns having a plurality of arcuate segments resiliently connected together to form a yieldable sealing ring around a rotary kiln. Such seals have not proven completely effective, however, in providing an air tight seal.

SUMMARY OF THE INVENTION

It is an object of the present invention to provide a radial seal for use in connection with a cylindrical rotatable member passing through a stationary member which is substantially air tight.

It is a further object of the invention to provide a radial seal which accommodates expansion and contraction of the parts associated therewith as well as eccentricity or out of roundness of the rotatable member.

The invention achieves the above objects by providing a radial seal for use in connection with a cylindrical rotatable member passing through a stationary member which includes a circular floating shoe mounted to the stationary member and surrounding the rotatable member. The shoe is comprised of a plurality of arcuate segments resiliently connected together around the rotatable member in sealing engagement therewith. A lap plate is mounted at one end of each segment to overlap an end of an adjacent segment to seal the spaces between adjacent segments. A cable surrounds a substantial portion of the shoe to restrict outward movement thereof. A wear resistant layer must be provided between the shoe and the rotatable member. A collar may also be mounted around the rotatable member with the shoe being maintained in sealing engagement with the collar.

These, together with other objects and advantages, which will be subsequently apparent, reside in the details of the construction and operation of the invention as more fully described and claimed hereafter, reference being made to the accompanying drawings forming a part hereof, wherein like numerals refer to like parts throughout.

BRIEF DESCRIPTION OF THE DRAWINGS

FIG. 1 is a front elevational view of a radial seal according to the present invention; and FIG. 2 is a cross-sectional view taken along line 2—2 of FIG. 1.

DESCRIPTION OF THE PREFERRED EMBODIMENTS

Referring to the drawings, shown in FIGS. 1 and 2 is a radial seal, generally indicated by the numeral 10, for use in connection with a cylindrical rotatable member 12 passing through a stationary member 14. The seal is particularly useful in connection with a rotary combustor system such as that shown in Harris et al. U.S. Pat. No. 3,822,651 which employs a rotary kiln in combination with a boiler or furnace. In such a system a pipe extends through the boiler to connect with an end of the rotary kiln and rotates with the kiln. The radial seal 10 of the present invention is particularly adapted for use at the point where the rotatable pipe passes through the stationary wall of the boiler.

The radial seal includes a circular floating shoe 16 movably mounted to stationary member 14 and surrounding rotatable member or pipe 12. Shoe 16 is comprised of a plurality of arcuate segments 18 resiliently connected together around rotatable member 12 in sealing engagement therewith. Each arcuate segment 18 has a lap plate 20 fixedly secured thereto at one end to overlap the end of an adjacent segment to seal the spaces between adjacent segments. As shown in FIG. 1, each segment 18 has a lap plate secured to its right end in overlapping, but not connected, relationship with the adjacent section to completely cover the space 22 between adjacent segments.

Each end of each segment 18 is provided with an upstanding bracket 24. The brackets at adjacent ends of the segments are connected by a bolt 26 having a spring 28 around one end thereof positioned between one of the brackets 24 and a pair of nuts 30 whereby the tension of the spring against the bracket may be adjusted by tightening or loosening the nuts. By adjusting the tension of the springs 28, the pressure of the shoe against the rotatable member may be adjusted.

As best shown in FIG. 2, each segment 18 of shoe 16 has an L-shaped crosssectional configuration with a shorter horizontal leg 32 and a longer vertical leg 34 at right angles thereto. The seal also preferably includes a collar 36 fixedly secured at at its outer end to rotatable member 12 in spaced relationship to the rotatable member. Collar 36 has an end wall 37 at its outer end perpendicular to the longitudinal axis of the rotating member 12 which is fixedly secured to a circular flange 39 mounted around the rotating member. Thus a space 41 is formed between the collar and rotating member which is sealed at one end. The floating shoe 16 surrounds collar 36 in sealing engagement therewith. In addition, the radial seal preferably includes a layer 38 of wear resistant material between horizontal leg 32 of each arcuate segment and collar 36. Layer 38 may be constructed of any suitable wear resistant material such as bronze or a plastic material such as teflon.

A cable 40 extends around a substantial portion of the shoe 16 to restrict the extent to which the shoe may move outwardly. The slack in the cable may be adjusted by means of a cable adjuster 42 attached to each end of the cable. The cable extends through each of the brackets 24 mounted on the arcuate segments 18 of the shoe 16.

The floating shoe 16 is mounted to stationary member 14 by means of a plurality of screws 44 spaced evenly around the shoe. The body of each screw 44 extends through a hole 46 in vertical leg 34 of each arcuate segment of the shoe and is threadably engaged to stationary member 14. Each hole 46 is larger in circumference than the body of screw 44, as most clearly shown in FIG. 2, in order to facilitate floating movement of the segments of the shoe. The floating shoe automatically adjusts for wear of the wear resistant layer 38. The spaces 22 between adjacent shoe segment 18 allow the shoe to automatically shrink as the wear resistant layer wears away.

Sandwiched between the head of screw 44 and vertical leg 34 of each segment are a plate washer 48 and a conical spring washer 50. Each plate washer 48 has a solid body portion which is larger than each hole 46 in order to seal out any leakage that may tend to occur through each hole. As shown in FIG. 2, each plate washer 48 rests adjacent vertical leg 34 of each arcuate segment and the conical spring washer 50 presses against the plate washer. The conical spring washer may be a belleville spring washer. By this construction, the spring washer bears down on each plate washer and assumes most of the weight of the radial seal assembly.

It is apparent from the above detailed description that many advantageous features are provided by the present invention. A radial seal is provided which includes lap plates covering the spaces between adjacent segments of the floating shoe to thereby provide an effective seal at those spaces and also includes plate washers for providing effective seals around the holes in the shoe segments to seal the holes against leakage. Moreover, the shoe is mounted to the stationary member in such a fashion that the shoe is permitted to move or float to accommodate eccentricities or out of roundness of the rotatable member during operation while still maintaining an effective seal. The resilient connections between adjacent segments of the shoe further facilitate the floating movement of the shoe. The floating shoe thus permits axial, lateral and rotational movement of the rotatable member while still providing an effective seal. The cable surrounding a substantial portion of the shoe restricts the outward movement of the shoe and further functions as an additional safety feature.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

I claim:

1. A radial seal for use in connection with a cylindrical rotatable member passing through a stationary member comprising:
   a collar mounted around said rotatable member and spaced therefrom to form a space between said collar and said rotatable member, said collar having an end wall fixedly secured to said rotatable member and said space being sealed at one end thereof by said end wall;
   a circular floating shoe surrounding said collar in sealing engagement therewith and mounted to said stationary member;
   said shoe comprising a plurality of arcuate segments resiliently connected together around said rotatable member in sealing engagement therewith, said segments being circumferentially spaced apart;
   a lap plate mounted at one end of each said segment to overlap an end of an adjacent segment to completely seal the circumferential spaces between adjacent segments; and
   a cable surrounding a substantial portion of said shoe to restrict outward movement thereof.

2. A radial seal as recited in claim 1 which includes a wear resistant layer between said shoe and said collar.

3. A radial seal as recited in claim 1 which includes a plurality of screws extending through a plurality of holes in said shoe and connected to said stationary member to mount said shoe to said stationary member, each of said holes being larger than the body of each of said screws to allow said shoe to float, and a plate washer and a conical spring washer mounted between the head of each screw and said stationary member whereby said conical spring washer bears down on said plate washer and assumes most of the weight of the radial seal, said plate washer being larger than said hole to provide a seal against leakage therethrough.

4. A radial seal as recited in claim 1 which includes means for adjusting the pressure of said shoe against said rotatable member.

5. A radial seal as recited in claim 1 which includes means for adjusting the slack of said cable.

* * * * *